(No Model.)  3 Sheets—Sheet 1.
P. PAYETTE.
EDGING MACHINE.

No. 451,162. Patented Apr. 28, 1891.

Witnesses:

Inventor:
Peter Payette
By,
D. le Ressout & Co
Attorneys.

(No Model.) 3 Sheets—Sheet 2.
P. PAYETTE.
EDGING MACHINE.
No. 451,162. Patented Apr. 28, 1891.
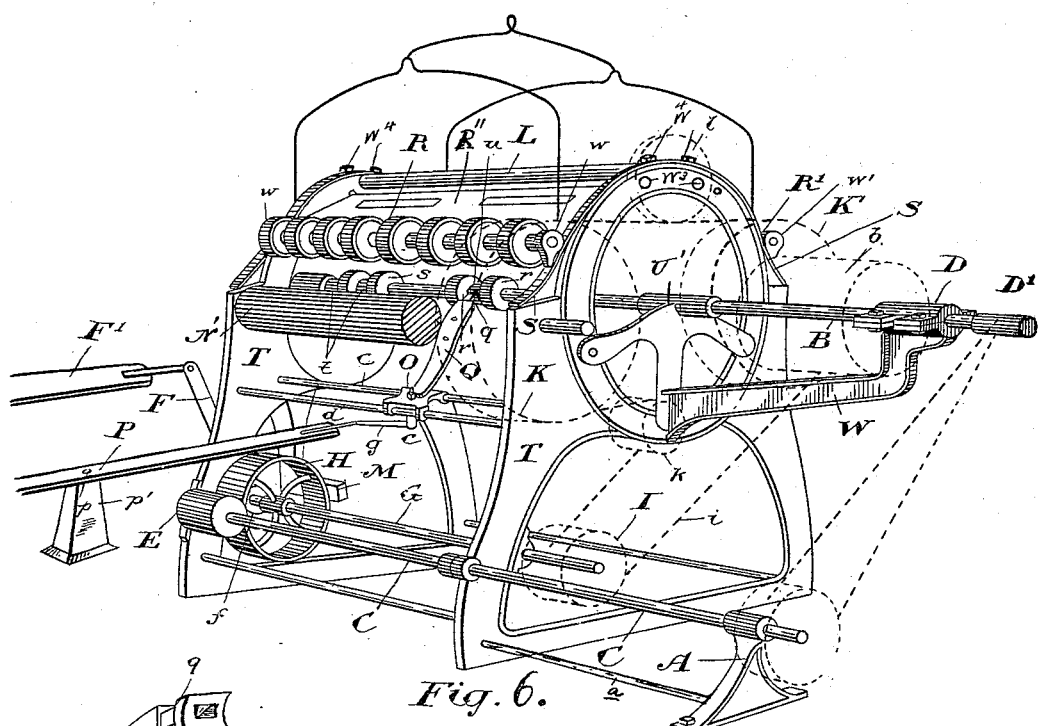
Fig. 6.
Fig. 3.
Fig. 4.
Fig. 2.
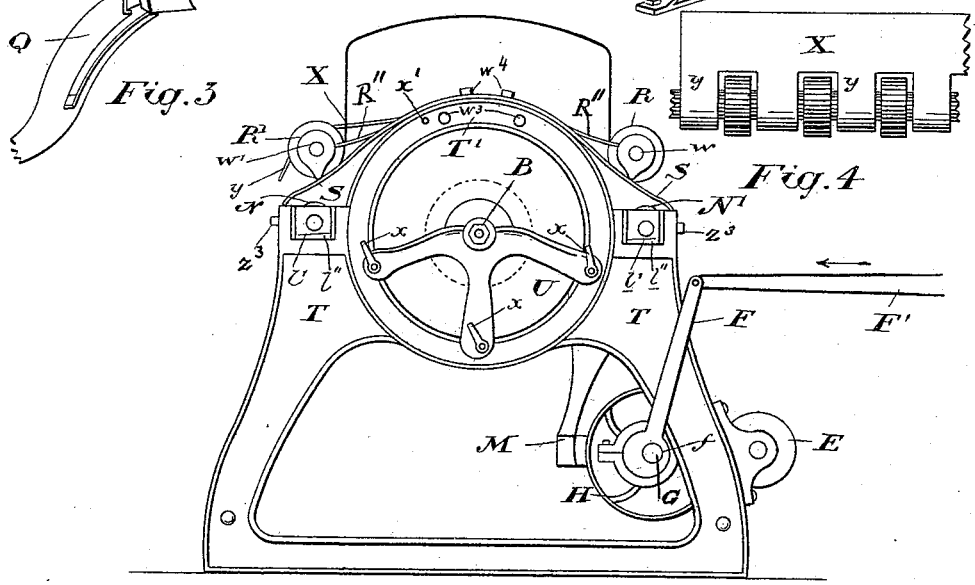
Witnesses
J. Edw. Mayhew
W. G. McMillan
Inventor
Peter Payette
by
Donald C. Ridout & Co
Attys (No Model.)

P. PAYETTE.
EDGING MACHINE.

No. 451,162.  Patented Apr. 28, 1891.

Witnesses

Inventor

UNITED STATES PATENT OFFICE.

PETER PAYETTE, OF PENETANGUISHENE, CANADA.

EDGING-MACHINE.

SPECIFICATION forming part of Letters Patent No. 451,162, dated April 28, 1891.

Application filed March 11, 1889. Serial No. 302,782. (No model.) Patented in Canada June 4, 1887, No. 26,844.

*To all whom it may concern:*

Be it known that I, PETER PAYETTE, machinist, of the town of Penetanguishene, in the county of Simcoe, in the Province of Ontario, Canada, have invented certain new and useful Improvements in Edging-Machines, of which the following is a specification.

The object of the invention is to produce an edger which, owing to the peculiar shape of the frame, is strong and compact and effects a saving in room and material, and which is provided with means for regulating and controlling the feed of the machine, so that it can be run slow or fast and stopped or started at the will of the operator without interfering with any other machine, and also provided with a device for shifting an adjustable saw on the mandrel, as well as with spring-bearings for the press-rollers, which cannot become clogged with sawdust, and having a bracket attached to the main frame, so as to afford bearings for the main driving shaft or mandrel, so that the belting can be placed all on one side of the edger and thus permit of more ready access to the saws when it becomes necessary to remove them.

Figure 1:
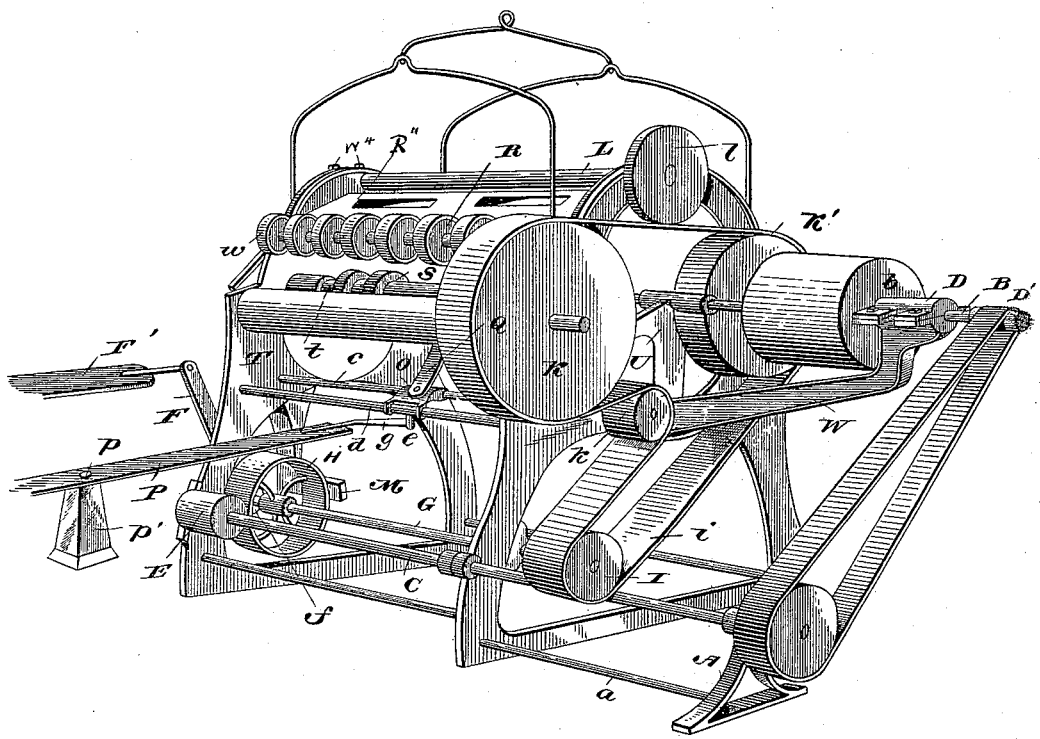
Figure 5:
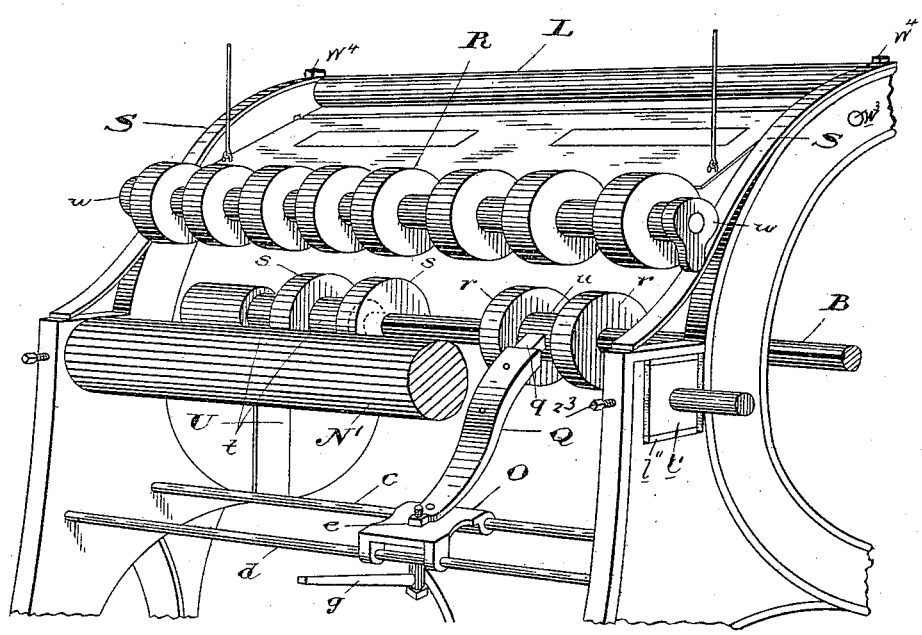

Figure 1 is a perspective front view of the edger. Fig. 2 is an elevation of the opposite side of the machine from that shown in Fig. 1. Fig. 3 is a detail of the shifter-arm. Fig. 4 is a detail of a guard over the rear press-roller. Fig. 5 is an enlarged perspective detail. Fig. 6 is a similar view to that shown in Fig. 1, but with the belts and belt-pulleys in dotted lines.

In the drawings like letters of reference indicate similar parts in the different figures.

In Fig. 1, A is an extension-piece, which may be bolted to the floor and contains a box or bearing for the shaft of the friction-drum, connected with the main frame of the machine by the rod $a$, which is bolted thereto. The mandrel B, on which the saws are placed, has bearings on the bearing-pieces U U' on the sides of the machine, and is extended on one side (see Figs. 1 and 6) beyond the main frame, and has bearings in a box D, formed on the bracket W, which is bolted to the main frame, as described. The pulley D' is driven by the mandrel B and communicates motion to the shaft C, which has bearings on the main frame and extension-piece A, and which also drives the small friction-drum E. The mandrel B is driven by the main belting, which passes over the large drum $b$.

F is an arm which is connected with the lever-arm F' by a link-joint, and which moves the eccentric bearing $f$ for the shaft G of the friction-drum H. When the arm F is drawn back, the friction-wheel H is thrown against the small friction-roller E and partakes of its motion, the shaft G giving motion to the pulley I, which carries the belting $i$. This belting, after passing over the small roller $k$, drives the feed-roller pulleys K K', as well as the small pulley $l$, which drives the roller L. This roller L is used for carrying boards back to the table when they require to be re-edged. By this method I am able to use a straight belt for driving the feed-rollers.

When it is desired to stop the feed-rollers, the lever-arm F' is pulled to the front. This moves the arm F, which controls the eccentric bearing $f$, and throws the friction-wheel H against the brake M; or, if it is desired merely to lessen the speed of the feed-rollers N N', this arm F is pushed slightly forward, so as to lessen the degree of contact between drums E and H, and thus the speed of the feed-rollers is completely under the control of the operator, so that the sawing may be stopped at once without necessitating the stoppage of other machines which may be driven by the same main belting.

$c$ and $d$ are parallel guide-bars which carry the cross-head O. Through the center of this cross-head and between the guide-bars passes the bolt $e$, which passes through a collar on the end of the arm $g$ and is secured in position by a nut. This arm $g$ is connected to the long lever-arm P, which is pivoted near its center at $p$ to any suitable support, as the standard $p'$, so that the operator by shifting the end of the lever-arm to the right or left can give transverse motion to the cross-head O, which, owing to the fact that it moves on two parallel bars and has a jointed connection with the lever-arm P, acquires an even motion with very little friction. This cross-head O has bolted to it a shifter-arm Q, which is cast hollow and carries a brass oil-case $q$, partially inclosed therein, the end of which fits between the saw-collars $r$, and its outer end clutches the small collar $u$, so as to carry the saws to the right or left when motion is given to the cross-head. Owing to this device for shifting, and the adoption of two parallel bars for the cross-heads to travel on, the adjustable saw, when moved by the operator, is held firmly in position, so that it must edge evenly, thus doing away with the giving of the saws which often occurs in other machines.

The mandrel B is grooved for the purpose of attaching thereto in the usual manner the collars $s$ and $r$, carrying the saws, the collars $s$ being rigidly attached. Between the collars $s$, and also between the outermost of these collars and the mandrel-bearing, I place movable collars $t$, which are slipped into place on the mandrel, and which vary in width, according to the position in which it is desired that said collars should be attached. Between the collars $r$ for the adjustable saw there is a small connecting-collar $u$, which is lubricated by the wooden float in the oil-case $q$. The end of the oil-case in the shifter-arm Q fits between the adjusted collars $r$, which it shifts to the right or left when the cross-head O is moved.

The press-rollers R R' are attached to a frame R'', which is pivoted to the machine in the usual manner, as shown at $w^3$, Fig. 2, the ends $w$ $w'$ resting, when the press-rollers are let down into position, on the steel springs S. These springs S are bolted to the top of the circular portion on the side frames T, as shown at $w^4$, Figs. 2 and 5, the ends thereof being free and resting on the shoulders of the frame of the machine. These springs keep the upper and lower feed-rollers a suitable distance apart and at the same time allow the necessary spring to enable the feed-rollers R R' to grip the board properly. These springs cannot become clogged with sawdust, which is apt to accumulate under the bearings of press-rollers of ordinary construction, thereby throwing the press-rollers out of position.

In Fig. 1 the machine is shown as a left-hand machine. The roller N' is shown broken away in Figs. 5 and 6 so as to show the shifter-arm clutching the adjustable saw-collars $r$, which move on the mandrel.

In Fig. 2 the shape of the casting of my frame T is shown. Both sides of the frame can be cast from one pattern and in one piece, and the edger built therewith can be used as a right-hand or left-hand machine, at the option of the person using it. This style of frame forms a very strong and compact machine and affords suitable bearings in convenient positions for the various shafts and mandrel. By adopting this style of frame the edger can be made narrower outside than any now made and yet afford as wide a cutting-space inside. Both sides of the frame are held together by stay-bolts and can readily be taken apart.

The bearing-piece U for the mandrel on the rear side of the edger (see Fig. 2) is provided with arms which radiate from the center and which are bolted onto the circular portion of the frame of the machine, the mandrel passing through the bearing at the center of the circle formed on the upper portion of the frame. The bearing-piece U can be readily removed from the side of the frame, being fixed on by nuts $x$, which will permit of the saws being taken off, and also permit of the machine being used as a right or left hand machine at option.

X is a guard pivoted at $x'$ to the upper end of the frame of the machine, and serves to prevent strips flying back when the machine is in operation. Its lower end is provided with fingers $y$, which set between the acting parts of the rollers R', and rest thereon, thus forming a support for the lower part of the guard X. The fingers also prevent pieces flying out through the apertures formed between the acting parts of the rollers R'.

In Fig. 2 the mode of operating the eccentric bearing $f$ of the friction-wheel H is illustrated, the friction-wheel H being thrown against the brake M and out of gear with the friction-drum E when the arm F is pushed back in the direction of the arrow by the long lever-arm F', which is operated from the end of the table, and the friction-wheel H is thrown into gear with the friction-drum E and away from the brake M by pulling the arm F forward in the opposite direction to that shown by the arrow. The shafts of the feed-rollers N N' run in boxes $l'$ and are secured in the frame by the set-screws $z^3$. They may be changed or lowered by packing adjusted by changing the position of the pieces $l''$, as occasion may require.

Fig. 3 is a detail showing the shifter-arm Q, which is bolted to the cross-head. This may be either cast hollow to contain the oil which carries a wooden float which lubricates the collar, or it may be formed, as shown, with a hollow casting which incloses a metal case $q$, preferably of brass, and rigidly secured therein, the end of the casting or case which impinges on the small collar $u$ for the movable saw being circular in shape, and a wooden float 2 rests on the oil contained in the casting or case for the purpose of lubricating the collar.

The saws can be very readily removed from either side by stopping the machine and removing the bearing-piece U. The extension-piece A and the belting being all on one side, there is nothing to interfere with the ready removal of the saws when necessary.

What I claim as my invention is—

1. In an edger, the combination of the guide-bars $c$ and $d$, connected to the frame T, and the cross-head O, which is pivotally connected to one end of the arm $g$, the other end of said arm $g$ being pivotally attached to the end of the pivoted lever-arm P, the hollow shifter-arm Q, which is rigidly attached to the cross-head, and the movable oil-case $q$, partially inclosed in the shifter and having its outer end clutching the connecting-collar $u$ between the adjustable saw-collars $r$, so as to shift the position of the adjustable saw-collars $r$ on the mandrel B when motion is given to the crosshead, substantially as specified.

2. The combination, in an edger, of a press-roller, a frame carrying said roller and which is pivoted to the main frame, and the springs S, which are bolted to the top of said main frame, the ends thereof being free, the extremities of said roller being adapted to rest on said springs near the free ends, substantially as specified.

3. The combination, in an edger, and with the press-roller R' thereof, of the guard X, pivoted to the main frame and having curved fingers $y$, which rest between the wheels on said press-roller R', substantially as described, and for the purpose specified.

4. The combination, in an edger, of the frame T, the saw-mandrel B, supported in said frame, the shaft C, carrying pulley E, said mandrel and shaft communicating motion one to the other by an intermediate belt passing around their respective pulleys, the shaft G, mounted in a shifting eccentric bearing $f$, the pulleys H I, mounted on said shaft, and the belt K', passing around said pulley I and around the pulleys of the feeding-rollers, substantially as described.

Penetanguishene, March 1, 1889.

PETER PAYETTE.

In presence of—
W. J. KEATING,
W. H. HEWSON.